(12) United States Patent
Smee et al.

(10) Patent No.: US 6,983,125 B2
(45) Date of Patent: Jan. 3, 2006

(54) METHOD AND APPARATUS FOR VARYING THE LENGTH OF AN ADAPTIVE EQUALIZER BASED ON DOPPLER FREQUENCY

(75) Inventors: John E. Smee, San Diego, CA (US); Ivan Jesus Fernandez-Corbaton, San Diego, CA (US); Srikant Jayaraman, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 767 days.

(21) Appl. No.: 09/965,204

(22) Filed: Sep. 25, 2001

(65) Prior Publication Data

US 2003/0078025 A1 Apr. 24, 2003

(51) Int. Cl.
*H04B 1/00* (2006.01)
*H03H 7/30* (2006.01)

(52) U.S. Cl. .................. 455/63.1; 455/67.16; 375/232
(58) Field of Classification Search .................. 455/43, 455/63.1–63.4, 67.13, 114.1, 114.2, 222, 455/276.1, 296, 307, 441, 444, 67.16; 379/406.08; 375/229, 232; 381/103; 370/289, 290; 340/552–554; 367/87, 90
See application file for complete search history.

(56) References Cited

U.S. PATENT DOCUMENTS

| | | | |
|---|---|---|---|
| 4,644,562 A | * 2/1987 | Kavehrad et al. | 375/232 |
| 4,901,307 A | 2/1990 | Gilhousen et al. | 370/320 |
| 5,103,459 A | 4/1992 | Gilhousen et al. | 370/206 |
| 5,175,747 A | * 12/1992 | Murakami | 375/232 |
| 5,504,773 A | 4/1996 | Padovani et al. | 375/130 |
| 5,909,384 A | 6/1999 | Tal et al. | 370/290 |
| 5,952,968 A | * 9/1999 | McDowell | 342/383 |
| 6,219,561 B1 | * 4/2001 | Raleigh | 455/561 |

FOREIGN PATENT DOCUMENTS

EP 1052820 A1 * 11/2000

OTHER PUBLICATIONS

Riera Palou et al., "Variable Length Equalizers for Broadband Mobile Systems", IEEE VTS $52^{nd}$, Vehicular Technology Conference, Boston, MA, Sep. 24–28, 2000: IEEE, Piscataway, USA, vol. 5, Sep. 24, 2000, pp. 2478–2485.*

Nicol et al. "A Low–Power 128–Tap Digital Adaptive Equalizer for Broadband Modems," IEEE Journal of Solid State Circuits, IEEE Inc. New York, USA, vol. 32, No. 11, Nov. 1997, pp. 1777–1789.

* cited by examiner

*Primary Examiner*—George Eng
(74) *Attorney, Agent, or Firm*—Philip Wadsworth; Sandra L. Godsey; Kent D. Baker

(57) ABSTRACT

Systems and methods according to the present invention are described for adjusting the number of taps in an adaptive equalizer over time as the rate of change of a communications channel varies. The number of taps or "equalizer length" is adjusted based on an estimate of the Doppler frequency between the devices communicating over a channel. The Doppler frequency is reflective of the rate of change of the communications channel. Greater Doppler frequencies indicate a more quickly varying channel, and vice versa. It is therefore desirable to change the equalizer length (by adding or dropping taps) based on a measurement of the Doppler frequency. Equalizer length is increased as the Doppler frequency decreases. Conversely, equalizer length is decreased as the Doppler frequency increases. This enables the equalizer to achieve a better compromise between the competing goals of adaptation speed (less taps) and ISI reduction (more taps).

28 Claims, 5 Drawing Sheets

METHOD AND APPARATUS FOR VARYING THE LENGTH OF AN ADAPTIVE EQUALIZER BASED ON DOPPLER FREQUENCY

BACKGROUND

1. Field

The present invention relates generally to wireless communications, and more specifically to varying the number of taps of an adaptive equalizer based on Doppler frequency.

2. Background

Today there are a variety of sophisticated wireless communications systems in use around the world. One such communication system is a code division multiple access (CDMA) system which conforms to the "TIA/EIA/IS-95 Mobile Station-Base Station Compatibility Standard for Dual-Mode Wideband Spread Spectrum Cellular System," hereinafter referred to as the IS-95 standard. The CDMA system allows for voice and data communications between users over a terrestrial link. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM," both assigned to the assignee of the present invention and incorporated by reference herein. The "TIA/EIA/IS-2000 Standard" describes a next generation cdma2000 multi-carrier 1x and 3x air interface specification, hereinafter referred to as the cdma2000 standard.

In the CDMA system, communications between users are conducted through one or more base stations. In this specification, a base station refers to the hardware with which user terminals communicate. A first user terminal communicates with a second user terminal by transmitting data on a reverse link to a base station. The base station receives the data and can route the data to another base station. The data is transmitted on a forward link of the same base station, or a second base station, to the second mobile station. The forward link refers to transmission from the base station to a user terminal and the reverse link refers to transmission from the user terminal to a base station. In IS-95 systems, the forward link and the reverse link are allocated separate frequencies.

Given the growing demand for wireless data applications, the need for very efficient wireless data communication systems has become increasingly significant. The IS-95 standard is capable of transmitting traffic data and voice data over the forward and reverse links. A method for transmitting traffic data in code channel frames of fixed size is described in detail in U.S. Pat. No. 5,504,773, entitled "METHOD AND APPARATUS FOR THE FORMATTING OF DATA FOR TRANSMISSION," assigned to the assignee of the present invention and incorporated by reference herein. Further, a high data rate (HDR) system that provides for high rate packet data transmission in a CDMA system is described in detail in the "TIA/EIA/IS-856—cdma2000 High Rate Packet Data Air Interface Specification" (hereinafter referred to as the HDR standard), as well as in co-pending U.S. patent application Ser. No. 08/963,386, entitled "METHOD AND APPARATUS FOR HIGH RATE PACKET DATA TRANSMISSION", filed Nov. 3, 1997, now U.S. Pat. No. 6,574,211, issued Jun. 3, 2003, and assigned to the assignee of the present invention and incorporated by reference herein.

Various techniques are employed in systems such as HDR to mitigate the effects of inter-symbol interference (ISI) arising from multipath propagation and imperfect filtering. For example, multiple receiver antennas can be used to exploit diversity against fading. This allows for signal processing in the spatial domain. Adaptive equalizers can also be employed at the receiver to cancel noise and interference in multipath environments. Spatial domain filtering and adaptive equalizers are well known techniques, and their use at the receiver can offer improved performance in systems such as HDR.

Adaptive equalizer performance can be characterized in a number of ways. Two important performance criteria are adaptation speed and minimizing mean square error (MMSE). Adaptation speed is particularly important in those environments where channel interference varies rapidly over time. The tracking ability of the equalizer will depend, at least in part, on the rate at which the equalizer coefficients (or taps) converge as the channel profile changes. Adaptation speed can be affected by a variety of factors. One factor is the selection of an algorithm for adapting the equalizer coefficients. These algorithms are often based on the criteria of minimizing the MSE between known pilot symbols and the equalizer's estimates of these pilot symbols. Two common examples of adaptive MMSE algorithms are the least-mean-square (LMS) algorithm and the recursive-least-squares (RLS) algorithm. For the same number of taps, an equalizer updated using the RLS algorithm will converge faster than an equalizer updated using the LMS algorithm, but the RLS algorithm is more complex to implement.

Another factor affecting adaptation speed is the number of taps in the equalizer, referred to herein as the equalizer length. Adaptation speed is inversely proportional to equalizer length simply because shorter equalizers have fewer coefficients that require updating.

The MMSE associated with an adaptive equalizer determines, among other things, the equalizer's effectiveness at reducing ISI once the filter coefficients converge. MMSE also depends on a number of factors including equalizer length. Longer equalizers will, in general, have a lower steady-state MMSE and will therefore be more effective at reducing ISI. But they will require longer periods of time to converge. Shorter equalizers will converge more quickly but they will have a higher MMSE and will therefore be less effective at reducing ISI.

The channel dynamics should therefore be considered when designing an adaptive equalizer, and particularly when selecting the equalizer length. In general, a shorter equalizer will perform better than a longer equalizer when the multipath channel is varying quickly. This is because shorter equalizers are better able to track the time-varying multipath. Conversely, longer equalizers are more desirable when the multipath channel is varying slowly because the longer equalizer has sufficient time to converge and does a better job at reducing interference.

However, it becomes difficult to set an appropriate equalizer length for those environments where the channel varies quickly over certain periods of time but slowly over other periods. Multipath interference on a mobile telephony channel may often be modeled as such. Shorter equalizers will be able to effectively track the quickly varying channel, but will not perform as well during slowly varying times. Longer equalizers will do a good job of reducing interference during slowly varying periods, but may not be able to effectively track quickly varying channels. An average length equalizer could also be selected that performs sub-optimally under all conditions.

There is therefore a need in the art for an adaptive equalizer capable of effectively reducing ISI in those environments where the rate of change of the channel varies over time.

SUMMARY

Embodiments disclosed herein address the above stated needs by adjusting the length of an adaptive equalizer over time as the rate of change of the communications channel varies. According to a first aspect of the present invention, equalizer length is adjusted based on an estimate of the Doppler frequency between the devices communicating over the channel. The Doppler frequency is reflective of the rate of change of the communications channel. Greater Doppler frequencies indicate more quickly varying channels, and vice versa. It is therefore desirable to change the equalizer length (by adding or dropping taps) based on a measurement of the Doppler frequency. Equalizer length is increased as the Doppler frequency decreases. Conversely, equalizer length is decreased as the Doppler frequency increases. This enables the equalizer to achieve a better compromise between the competing goals of adaptation speed (fewer taps) and MMSE (more taps).

DETAILED DESCRIPTION

Overview

Figure 1A:
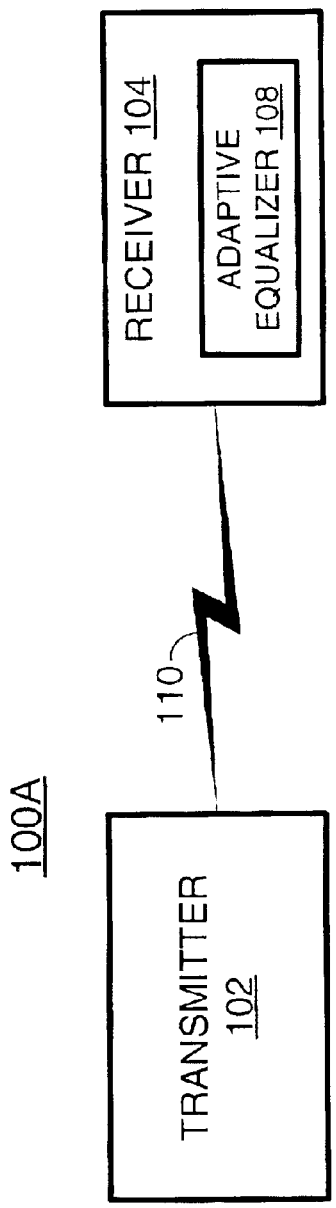
FIG. 1A depicts an example communications environment within which the present invention operates.

The present invention relates generally to adjusting the number of taps in an adaptive equalizer based on the rate of change of the communications channel as indicated by the Doppler frequency. FIG. 1A depicts an example communications environment 100A within which the present invention can operate. Example communications environment 100A includes a transmitter 102 in communication with a receiver 104 via a wireless channel 110. Transmitter 102 can represent any device capable of transmitting information over wireless channel 110. Similarly, receiver 104 can represent any device capable of receiving information over wireless channel 110. Receiver 104 includes an adaptive equalizer 108 for suppressing the effects of noise and interference introduced by wireless channel 110. Wireless channel 110 can represent any wireless link over which information can flow according to a defined communication protocol. Communications over wireless channel 110 can, for example, conform to the IS-95 CDMA standard, the cdma2000 standard, and/or the HDR standard.

According to example embodiments of the present invention, the number of taps, also referred to as the length of adaptive equalizer 108, is adjusted as the rate of change of wireless channel 110 varies over time. Generally speaking, the equalizer length is decreased as the rate of change increases, and conversely, the equalizer length is increased as the rate of change decreases. In this way, an equalizer having a longer length is used during periods where wireless channel 110 is varying more slowly, thereby taking advantage of the lower MMSE and greater ISI reduction associated with having more taps. An equalizer having a shorter length is used during periods where wireless channel 110 is varying more quickly, thereby taking advantage of the greater adaptation speed associated with having fewer taps.

However, the rate of change of wireless channel 110 is difficult to measure directly. According to the present invention, estimates of the Doppler frequency are used instead as an indication of the rate of change of multipath profile over wireless channel 110. As will be apparent to those skilled in the art, the Doppler frequency represents the change in frequency at receiver 104 due to the relative motion of the receiver and transmitter 102. This relative motion can cause changes to the multipath: the greater the relative motion, the greater the rate of change in the multipath, and vice versa. The length of adaptive equalizer 108 is adjusted as the Doppler frequency changes, indicating either a greater or lesser rate of change in the multipath.

Figure 1B:
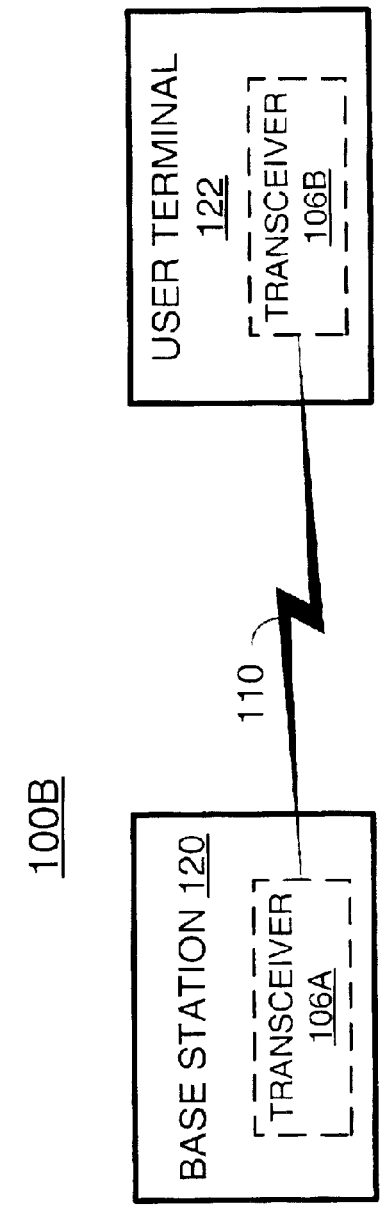
FIG. 1B depicts a mobile communication environment that includes a base station in communication with a user terminal via a wireless channel.

As will be apparent, receivers so configured may find application in many different environments. For example, FIG. 1B depicts a mobile communication environment 100B that includes a base station 120 in communication with a user terminal 122 via wireless channel 110. Wireless channel 110 in this example environment can represent the forward and/or reverse link. Base station 120 and user terminal 122 both include a transceiver 106 (shown as 106A in base station 120, and 106B in user terminal 122) for full-duplex communication, wherein transceiver 106 includes both transmitter and receiver sections. Both transceivers 106 may therefore be configured in relevant part as described with respect to receiver 104, though the following description focuses more on applications for the forward link wherein the receiver section in user terminal 122 is configured as described herein.

In mobile communication environment 100B, user terminal 122 can, for example, represent a cellular telephone being used by a passenger in an automobile. As the automobile moves at varying speeds and directions in relation to base station 120, the multipath profile of wireless channel 110 will also vary. The Doppler frequency measured between the base station and automobile will be reflective of the rate of change of the multipath interference. According to example embodiments of the present invention, user terminal 122 employs adaptive equalizer 108 in transceiver 106B whose length is adjusted to account for the varying multipath.

Receiver 104 may be configured to perform the operations described herein in hardware, software, or a combination of both. These operations are described herein and illustrated in the appended flowcharts. It will be apparent to those of skill in the art that many of these operations can be interchanged without departing from the scope of the invention. It will also be apparent that there could be many different ways of implementing the invention in computer programming, whether software or a combination of hardware and software, and the invention should not be construed as limited to any one set of computer program instructions. Further, a skilled programmer would be able to write one or more computer programs to implement the disclosed invention without difficulty based on the flowcharts and associated written description included herein. Therefore, disclosure of a particular set of program code instructions is not considered necessary for an adequate understanding of how to make and use the invention. The inventive functionality of the claimed computer programs and/or hardware devices will be explained in more detail in the following description in conjunction with the remaining figures illustrating the program flow.

Figure 2A:
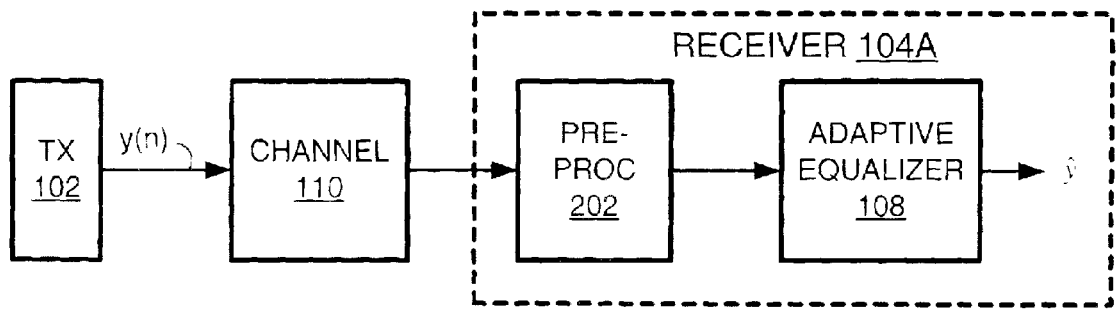
FIG. 2A depicts a wireless receiver in greater detail according to an example embodiment of the present invention.

FIG. 2A depicts an example receiver 104A in greater detail according to an example embodiment of the present invention. Receiver 104A includes a pre-processor 202 and adaptive equalizer 108. As will be apparent, receiver 104A can include other components such as an antenna (not shown). As shown in FIG. 2A, a stream of digital data y(n) is transmitted through wireless channel 110 and is corrupted by additive noise and interference including multipath interference. The corrupted data is received by pre-processor 202 in receiver 104A. Pre-processor 202 can include, for example, a radio receiver, radio-frequency (RF) to baseband converter, lowpass filter, automatic gain control (AGC), and analog-to-digital conversion (ADC) (none shown).

According to an example embodiment of the present invention, transmitter 102 and receiver 104A exchange information via wireless channel 110 using data frames (alternatively referred to herein as slots). Data is exchanged within HDR systems in this fashion. Frames can include several portions, such as a pilot portion, a control portion, and a data portion. The pilot portion includes pilot symbols that are a priori known to receiver 104A. These pilot symbols are used by adaptive equalizer 108 to adapt the filter coefficients so that noise and interference introduced by wireless channel 110 are mitigated. The control portion includes control symbols that are used to trigger various control functions within receiver 104A. The data portion represents the data payload being transmitted by the frame.

Adaptive equalizer 108 represents a time-varying filter structure having a plurality of filter coefficients (not shown). As will be apparent to those skilled in the art, adaptive equalizer 108 can be implemented as hardware, software, or a combination of both. As will also be apparent, various adaptive algorithms can be used to adjust the filter coefficients, such as the LMS algorithm or the RLS algorithm. Furthermore, adaptive equalizer 108 can be implemented as a finite impulse response (FIR) filter or an infinite impulse response filter (IIR). The various example embodiments of the present invention described herein are independent of the particular structure or filter coefficient adaptation algorithm chosen for adaptive equalizer 108.

The output of adaptive equalizer 108 represents an estimate of the transmitted symbol y(n). For example, if linear equalization is used adaptive equalizer 108 represents a tapped delay line FIR filter with coefficients C. The FIR output can be expressed as:

$$\hat{y}[n] = \sum_{m=-M_1}^{M_2} (C^m) * X^m[n]$$

where the linear equalizer has $M_1+M_2+1$ taps. For a symbol-spaced equalizer, $X^m[n]=X[n-m]$. Denoting the main (cursor) tap by the index m=0, the equalizer is said to have $M_1$ anti-causal taps (i.e., coefficients which multiply the signal samples that come after the cursor sample) and $M_2$ causal taps (i.e., coefficients which multiply signal samples that come before the cursor sample). According to various example embodiments of the present invention, techniques are described for adjusting $M_1$ and $M_2$ based on estimates of the Doppler frequency.

Figure 2B:
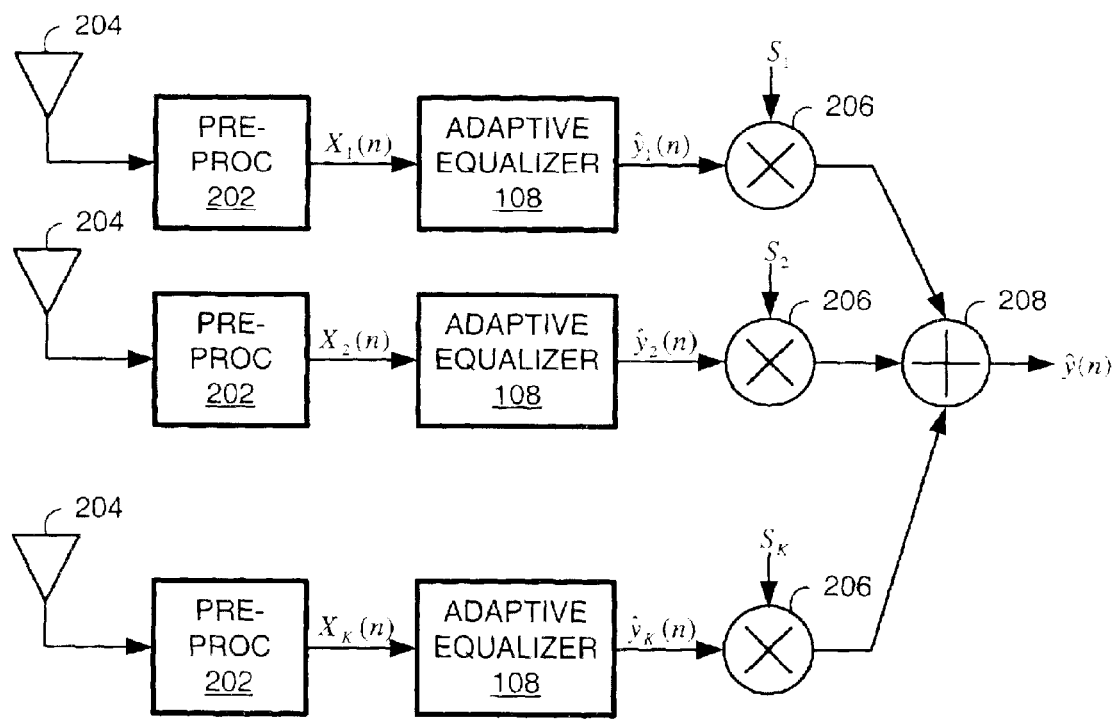
FIG. 2B depicts an example multiple-antenna adaptive equalizer according to another example embodiment of the present invention.

FIG. 2B depicts an example multiple-antenna receiver 104B according to another example embodiment of the present invention. As shown in FIG. 2B, receiver 104B includes two or more antenna paths, where the number of paths is given by K. Each path includes an antenna 204, pre-processor 202, adaptive equalizer 108, and phase shift 206 with phase shift value $S_k$. The contributions of the various antenna paths are combined in a signal combiner 208. For example, if linear equalization is used, the equalizer for the path from the mth antenna is a tapped delay line FIR filter with coefficients $C_m$. The output of the temporal equalizer for each antenna path represents an estimate of the transmitted symbol. For example, the FIR output for antenna k is given by:

$$\hat{y}_k[n] = \sum_{m=-M_1}^{M_2} (C_k^m) * X_k^m[n]$$

The techniques described below for adjusting the equalizer length for a single-antenna receiver may also be applied to each antenna path of multiple-antenna receiver 104B.

For combined space-time equalization, we may form an estimate of the transmitted symbol y[n] using the individual symbol estimates (of y[n]) from each antenna and combining such estimates by means of a set of spatial coefficients that we can call $S_k[n]$. If we wish to implement global space-time MMSE, we can set all those coefficients to unity and form the combined symbol estimate from the K antennas in the following fashion:

$$\hat{y}[n] = \sum_{k=1}^{K} \hat{y}_k[n]$$

With E as the expectation operator, the MSE is given by:

$$MSE = E|y[n]-\hat{y}[n]|^2.$$

Typically, MMSE optimization is implemented by adaptive algorithms (e.g., RLS or LMS) or by correlation estimation and direct matrix inversion. For LMS optimization, the update equation for the mth coefficient on the kth antenna is $$C_k^m[n+1]=C_k^m[n]+\Delta X_k^m[n](y[n]-\hat{y}[n])^*$$

where $\Delta$ is the LMS step size parameter. The step-size parameter for the LMS algorithm controls the tradeoff between adaptation speed and misadjustment error (called excess MSE). If the step size is made too large, the algorithm is not guaranteed to converge. In the normalized LMS algorithm, the step size parameter depends on the energy of the observation vector X. When an AGC (which attempts to keep the received power per sample at $I_o$) is employed in the receiver, then the step size can be set based on a normalized step parameter and the expected energy summed over all the taps and antennas $$\Delta = \frac{\Delta_N}{K*(M_1 + M_2 + 1)*I_0}.$$

Since stability of this normalized LMS algorithm is based on the value of $\Delta_N$, it can be seen that a smaller number of taps enables a larger value for $\Delta$ and hence faster convergence and better tracking ability at higher Doppler frequencies.

General Method

Figure 3:
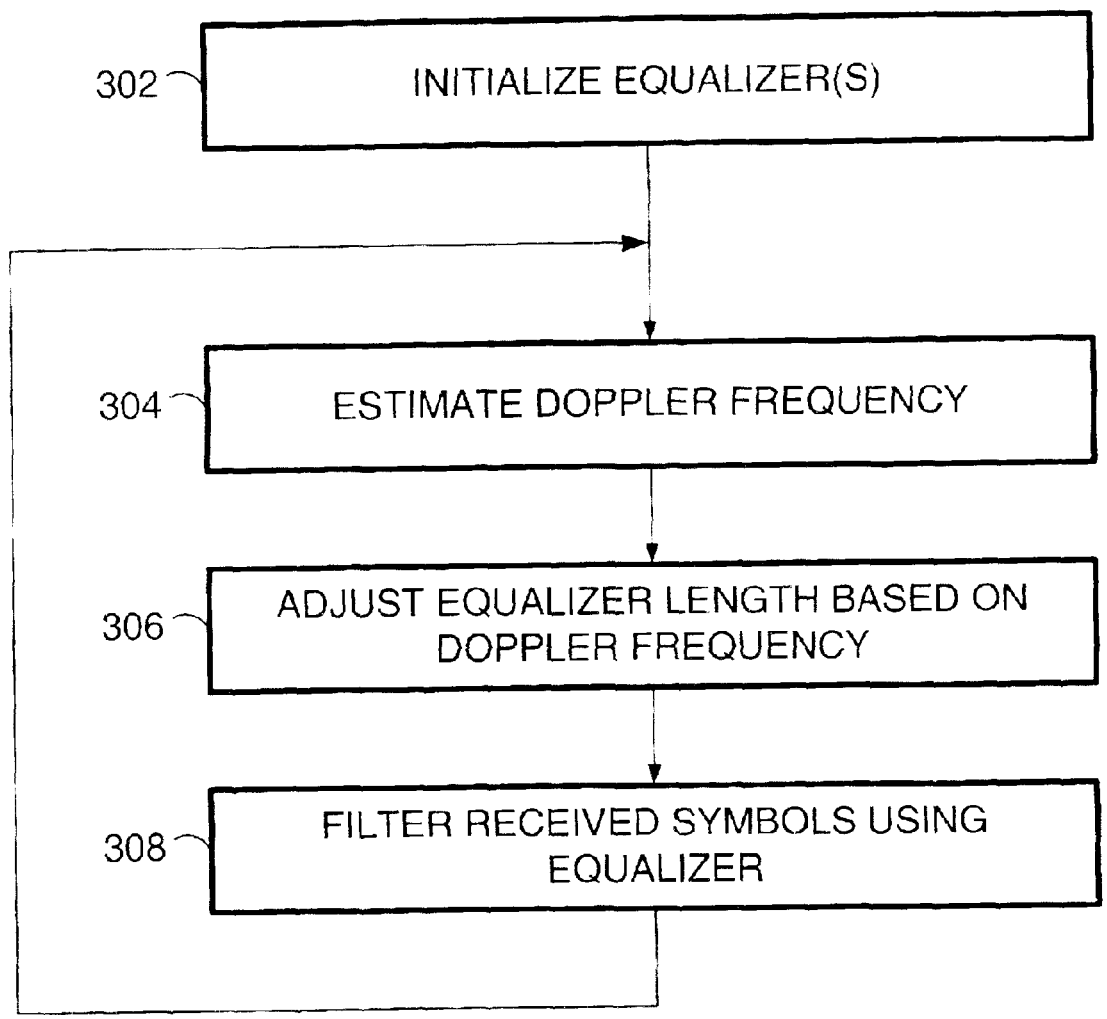
FIG. 3 is a flowchart that describes a general method according to an example embodiment of the present invention for adjusting the length of an adaptive equalizer based on estimates of the Doppler frequency.

FIG. 3 is a flowchart 300 that describes a method according to an example embodiment of the present invention for adjusting the length of adaptive equalizer 108 based on estimates of the Doppler frequency that are reflective of the rate of change of wireless channel 110.

In operation 302, adaptive equalizer 108 is initialized, including setting an initial length and initial values for each of the coefficients. According to a first example embodiment of the present invention, an estimate of the Doppler frequency is used to determine the equalizer length (estimating the Doppler frequency is described in greater detail below with respect to operation 304). As will be apparent, the number of taps that are appropriate for a particular application can vary according to a variety of factors, such as the system sample rate and the symbol bandwidth. However, in general, a greater number of taps are selected for relatively low Doppler frequencies, and fewer taps are selected for relatively high Doppler frequencies.

This can be implemented as a look-up table such as the example Table 1. Table 1 associates a number of anti-causal taps ($M_1$) and causal taps ($M_2$) with particular Doppler frequencies. In this example, the measured Doppler frequency is quantized into frequency bins that are 5 Hz wide with the indicated bin centers. For example, the first row of Table 1 describes the first frequency bin that extends from 0 Hz to 5 Hz with a bin center of 2.5 Hz. If the initial Doppler frequency is estimated to be between 0 Hz and 5 Hz, then the equalizer length with be initialized to 31 taps, including a main tap, 15 causal taps, and 15 anti-causal taps.

TABLE 1

| Doppler Frequency Bin Center Frequency (Hz) | $M_1$ | $M_2$ |
|---|---|---|
| BinCenter[m] = 2.5 | 15 | 15 |
| BinCenter[m] = 7.5 | 11 | 11 |
| BinCenter[m] = 12.5 | 8 | 8 |
| BinCenter[m] = 17.5 | 6 | 6 |
| BinCenter[m] = 22.5 | 4 | 4 |
| BinCenter[m] = 27.5 | 3 | 3 |
| BinCenter[m] ≧ 32.5 | 2 | 2 |

According to a second example embodiment, the equalizer length is initialized to a pre-set number of taps selected to be a compromise between adaptation speed and MMSE.

The equalizer coefficients are initialized according to any conventional adaptive algorithm technique. Those of skill in the art will recognize that adaptive filters can be initialized in different ways. Techniques according to the present invention do not depend upon the equalizer coefficients being initialized in any particular manner.

In operation 304, the Doppler frequency between transmitter 102 and receiver 104 is estimated. The Doppler frequency $f_D$ is reflective of the bandwidth of the fading process over wireless channel 110 and can be related to the velocity v of a mobile receiver (for a fixed transmitter) by $f_D = v/\lambda$ where $\lambda$ is the transmission wavelength. Many conventional techniques are available for measuring the Doppler frequency. For example, it is well known that an estimate of $f_D$ can be obtained at a receiver by measuring the zero-crossing rate of the received signal. However, the techniques described herein according to the present invention do not depend upon any particular method being used for estimating the Doppler frequency.

According to an example embodiment of the present invention, the Doppler frequency is estimated periodically and used to adjust the equalizer length. However, the Doppler frequency need not be estimated on a strictly periodic basis, but rather may be estimated on an intermittent basis over time that is not necessarily periodic.

In operation 306, the length of adaptive equalizer 108 may be adjusted based on the Doppler frequency estimate taken in operation 306. In general, the length of adaptive equalizer 108 may be increased as the Doppler frequency decreases. Conversely, the length of adaptive equalizer 108 may be decreased as the Doppler frequency increases. Various example embodiments of the present invention are described in greater detail below wherein the length is only adjusted if a certain amount of time has elapsed since the last length adjustment, or only if the change in Doppler frequency exceeds a certain threshold. These example embodiments are described below with respect to FIGS. 4 and 5.

In operation 308, adaptive equalizer 108 is applied to the received data symbols to filter noise and interference introduced by wireless channel 110. As described above, in a mobile telephony environment adaptive equalizer 108 can be used to reduce multipath interference and thereby reduce ISI between the received symbols. Operations 304 through 308 are repeated over time, with new estimates of the Doppler frequency being used to adjust the length of adaptive equalizer 108 as the rate of change of wireless channel 110 varies.

The following sections describe various example embodiments of the present invention that expand on the basic operations presented in FIG. 3.

Adjusting Equalizer Length Considering Elapsed Time and Frequency Thresholds

Figure 4:
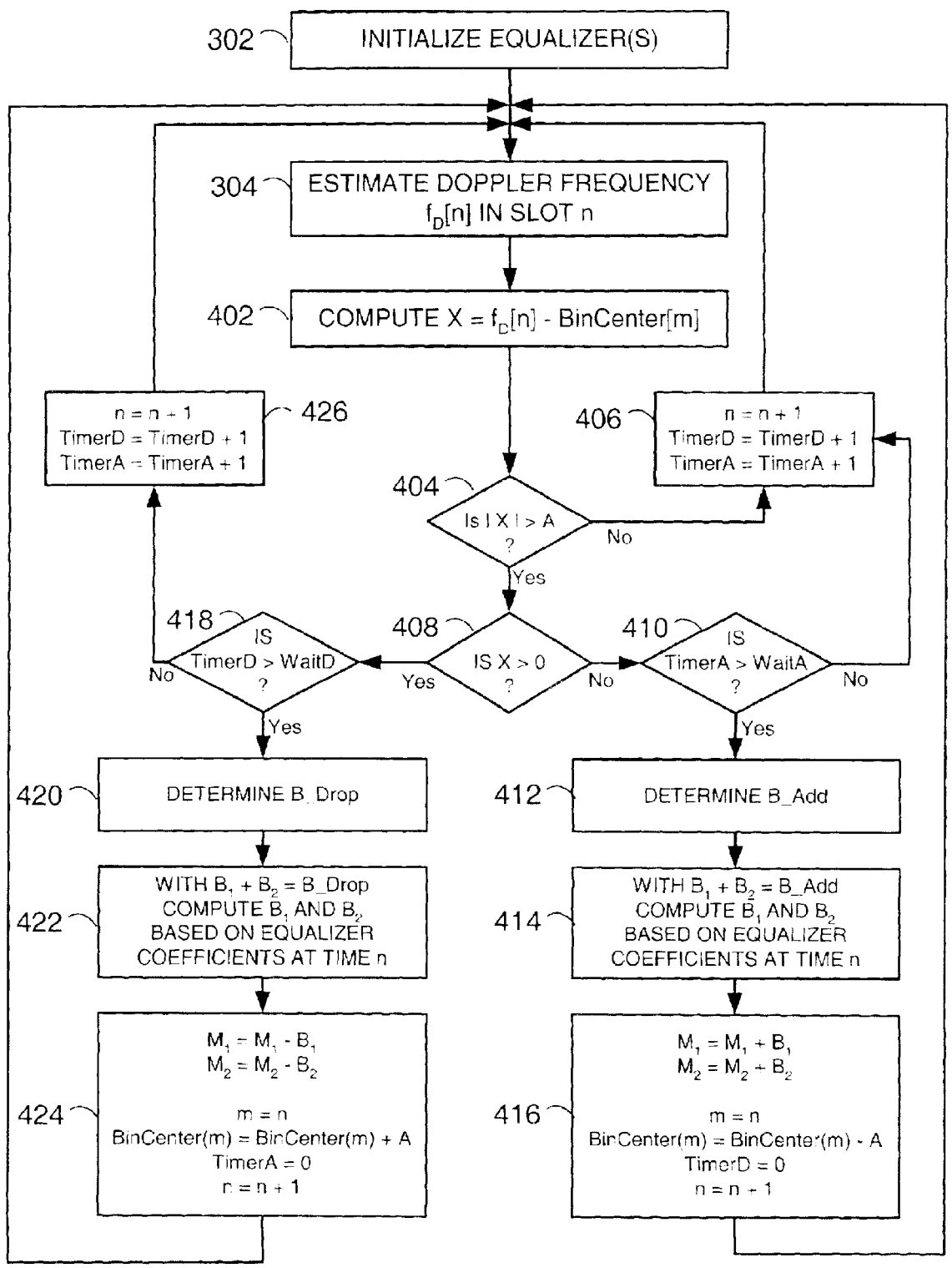
FIG. 4 is a flowchart that describes a more complex method according to an example embodiment of the present invention for adjusting the length of an adaptive equalizer.

FIG. 4 is a flowchart that describes a method according to the present invention for adjusting the length of adaptive equalizer 108, with consideration given to whether sufficient time has elapsed since the last length adjustment, and to whether the change in Doppler frequency has exceeded a certain minimum threshold. The operations of FIG. 4 are described below in the context of an example HDR system for illustrative purposes only. However, it will be apparent to those of skill in the art that the underlying concepts associated with these operations can be applied equally well to other communications systems.

Operations 302 and 304 are described above with respect to FIG. 3. However, some additional variables are initialized in operation 302 according to this example embodiment of the present invention. The current slot index n is initialized to zero to indicate that operation is beginning with the first received frame of data. A most recent change index m is initialized to zero. The most recent change index indicates the index of the last frame in which the length of adaptive equalizer 108 was changed. The manner in which this information is used is described in detail below.

The Doppler frequency, shown as $f_D[n]$, is measured in operation 304 with each frame of received data. In the example HDR implementation, the length of adaptive equalizer 108 may only be changed once per slot (or less), based on the Doppler frequency associated with the slot. The Doppler frequency estimate is taken at the beginning of the current frame of data. This allows for adjustments to be made to the equalizer length prior to training the equalizer coefficients during the pilot portion of the frame. The Doppler estimate taken during the first slot is given by $f_D[0]$. This estimate is quantized and used to set the initial length of adaptive equalizer 108. The bin size for Doppler frequency quantization operations is given by A in the following description.

In operation 402, a difference (X) is calculated between the Doppler frequency estimate for the current slot ($f_D[n]$) and the bin center of the Doppler frequency measurement corresponding to the most recent change (BinCenter[m]). In operation 404, this difference is compared to the bin width A. If the magnitude of the difference is not greater than A, then the length of adaptive equalizer 108 will not be changed for the current frame. In other words, according to this example embodiment of the present invention the equalizer length is only changed when the Doppler frequency changes by an amount greater than the frequency bin size. This has the desirable effect of preventing meaningless length adjustments that would otherwise result from relatively small changes in the Doppler frequency. As will be apparent, thresholds other than the bin size could be applied to this difference if greater or fewer changes to equalizer length are desired.

In operation 406 the slot index n is incremented, as are two timers: TimerD and TimerA. TimerD indicates the number of slots elapsed since the last slot in which the equalizer length was increased. Conversely, TimerA indicates the number of slots elapsed since the last slot in which the equalizer length was decreased.

If the difference X is greater than A, then in operation 408, it is determined whether the difference X is positive or negative indicating an increase or decrease in Doppler frequency respectively. If the Doppler frequency has decreased, then in operation 410, it is determined whether TimerA satisfies a threshold WaitA. WaitA represents the minimum amount of time that is required to elapse since the last time taps were dropped, before taps can be added to adaptive equalizer 108. Similarly, TimerD and WaitD in operation 418 are used to ensure that a minimum amount of time has elapsed since the last time taps were added, before allowing taps to be dropped. The operation of these two timers in combination prevents continual adding and subtracting of taps when the Doppler frequency is close to one of the quantization boundaries (given by positive integer multiples of A Hz). If the elapsed time threshold WaitA has not been satisfied, the equalizer length is not adjusted and the slot index and timers are incremented in operation 406.

If the elapsed time threshold WaitA has been satisfied, then in operation 412 the number of taps to be added (B_Add) is determined. According to an example embodiment of the present invention, B_Add is determined by consulting a look-up table that associates a number of taps with the bin center of the quantized Doppler frequency. An example look-up table is Table 2, shown below. As can be seen in Table 2, more taps are added (or dropped) at the lower Doppler frequencies. This is because changes at the lower Doppler frequencies are more meaningful than changes at the higher frequencies in terms of the effect of channel variation on the excess MSE.

TABLE 2

| Doppler frequency (Hz) at center of bin | Number of taps to add (B_Add) | Number of taps to drop (B_Drop) |
| --- | --- | --- |
| BinCenter[m] = 2.5 | 0 | 8 |
| BinCenter[m] = 7.5 | 8 | 6 |
| BinCenter[m] = 12.5 | 6 | 4 |
| BinCenter[m] = 17.5 | 4 | 4 |
| BinCenter[m] = 22.5 | 4 | 2 |
| BinCenter[m] = 27.5 | 2 | 2 |
| BinCenter[m] = 32.5 | 2 | 0 |
| BinCenter[m] > 37.5 | 0 | 0 |

For example, assume that the bin center of the Doppler frequency measurement corresponding to the most recent change is 17.5 Hz, and that the Doppler frequency estimate for the current frame ($f_D[n]$) is 12 Hz. Since X (17.5 Hz–12 Hz=5.5 Hz) is greater than A (5 Hz), and further assuming that a sufficient amount of time has elapsed since the equalizer length was last decreased (i.e., TimerA>WaitA), taps will be added in operation 412. Table 2 is consulted using the old bin center of 17.5 Hz, with the result that 4 taps will be added (B_Add=4) to adaptive equalizer 108.

The new taps can be either anti-causal taps, causal taps, or both (as reflected by a change in $M_1$, $M_2$, or both, respectively). The number of taps added to the anti-causal side is given by $B_1$, and the number of taps added to the causal side is given by $B_2$, where $B_1+B_2=B\_Add$.

According to a first example embodiment, taps are added to the side (either causal or anti-causal) that is considered to be more useful. In general, those taps having a coefficient of higher magnitude are considered more useful because they contribute more to the filter output. The usefulness determination is based on the most recent value of the equalizer coefficients.

For example, consider a 5-tap equalizer with $M_1=2$ and $M_2=2$ and a coefficient vector given by:

$$\{C_k^{-2}[n], C_k^{-1}[n], C_k^0[n], C_k^1[n], C_k^2[n]\}.$$

If the values of this equalizer are $$\{-0.03, 0.05, 0.98, 0.3, -0.2\}$$

and the Doppler frequency measurement indicates that 2 taps are to be added (B_Add=2) to increase the equalizer length to 7, then it would be more beneficial to add the taps to the causal side ($B_1=0$ and $B_2=2$) because the causal taps are more useful. The causal taps are considered to be more useful because the magnitude of the causal coefficients (0.3, 0.2) is greater than the magnitude of the anti-causal coefficients (0.03, 0.05). This results in the new values $M_1=2$ and $M_2=4$.

A suitable rule for adding taps based on tap usefulness (using old values of $M_1$ and $M_2$) would be:

Set $B_1=B\_Add$ and set $B_2=0$ if $|C_k^{-M1}[n]|>|C_k^{M2}[n]|$

Set $B_2=B\_Add$ and set $B_1=0$ if $|C_k^{M2}[n]|>|C^{-M1}[n]|$.

In other words, the additional taps are added to the side with the coefficient having the greatest magnitude at the outermost tap (i.e., the tap furthest from the main tap). As will be apparent, other rules can alternatively be used for distributing the new taps amongst the causal and anti-causal sides of the equalizer based on the usefulness of the taps. For example, the average magnitude of the taps on the causal side and anti-causal side can be compared as another measure of which taps are more useful.

According to a second example embodiment of the present invention, new taps may be added to the side currently having fewer taps. A suitable rule based on this criteria is given by:

Set $B_1=B\_Add$ and set $B_2=0$ if $M_1<M_2$

Set $B_2=B\_Add$ and set $B_1=0$ if $M_2<M_1$

Set $B_1=B\_Add/2$ and set $B_2=B\_Add/2$ if $M_1=M_2$

This rule represents a more conservative approach to adding taps to adaptive equalizer 108, since it does not allow one side or the other to become disproportionately large.

Once the new taps have been added in operation 414, various housekeeping variables are updated in operation 416. The number of anti-causal and causal taps ($M_1$, $M_2$) are updated according to the number of taps that were added ($B_1$, $B_2$). The most recent change index m is updated to reflect the current slot index n, and the most recent bin center (BinCenter[m]) is updated to reflect the bin center of the decreased Doppler frequency. The elapsed timer TimerD is reset, and the current slot index n is incremented to the next frame.

Returning now to operation 408, if the difference X is positive indicating an increase in Doppler frequency, then there is a possibility that the equalizer length will be decreased by dropping taps from either the causal side, anti-causal side, or both. Operations 418 through 426 describe the process of dropping taps, which is similar to operations 410 through 416 for adding taps.

In operation 418, it is determined whether a sufficient amount of time has elapsed since the last increase in length, which is accomplished by comparing TimerD to the threshold WaitD. If the threshold is not satisfied, the length of adaptive filter 108 is not adjusted and in operation 426 the timers and slot counter are incremented before waiting for the next Doppler estimate in operation 304. If the threshold is satisfied, the number of taps to be dropped (B_Drop) is determined in operation 420 by consulting a look-up table using the bin center of the current Doppler frequency.

In operation 422, it is determined whether taps will be dropped from the causal side, the anti-causal side, or both. As described above with respect to adding taps, taps can be dropped from the side considered to be less useful. According to this example embodiment, a suitable rule for dropping taps would be:

Set $B_1=B\_Drop$ and set $B_2=0$ if $|C_k^{-M1}[n]|<|C_k^{M2}[n]|$

Set $B_2=B\_Drop$ and set $B_1=0$ if $|C_k^{M2}[n]|<|C^{-M1}[n]|$.

where taps are dropped from the side with the coefficient having the lowest magnitude at the outermost tap. Alternatively, according to a second example embodiment a more conservative rule for dropping taps would be:

Set $B_1=B\_Drop/2$ and set $B_2=B\_Drop/2$ where taps are dropped equally from both sides.

In operation 424, the housekeeping variables are updated once the taps have been dropped. The number of anti-causal and causal taps ($M_1$, $M_2$) are updated according to the number of taps that were dropped ($B_1$, $B_2$). The most recent change index m is updated to reflect the current slot index n, and the most recent bin center (BinCenter[m]) is updated to reflect the bin center of the increased Doppler frequency. The elapsed timer TimerA is reset, and the current slot index n is incremented to the next frame.

As described above, operations 304 and 402 through 426 are repeated for each frame of data in an HDR system. A determination is made whether to adjust the length prior to applying adaptive equalizer 108 to the pilot portion of the frame. Once the coefficients have been trained on the pilot portion, adaptive equalizer 108 is applied to the data portion of the frame (operation 308) to cancel the multipath interference and thereby decrease the ISI.

Simplified Method for Adjusting Equalizer Length

Figure 5:
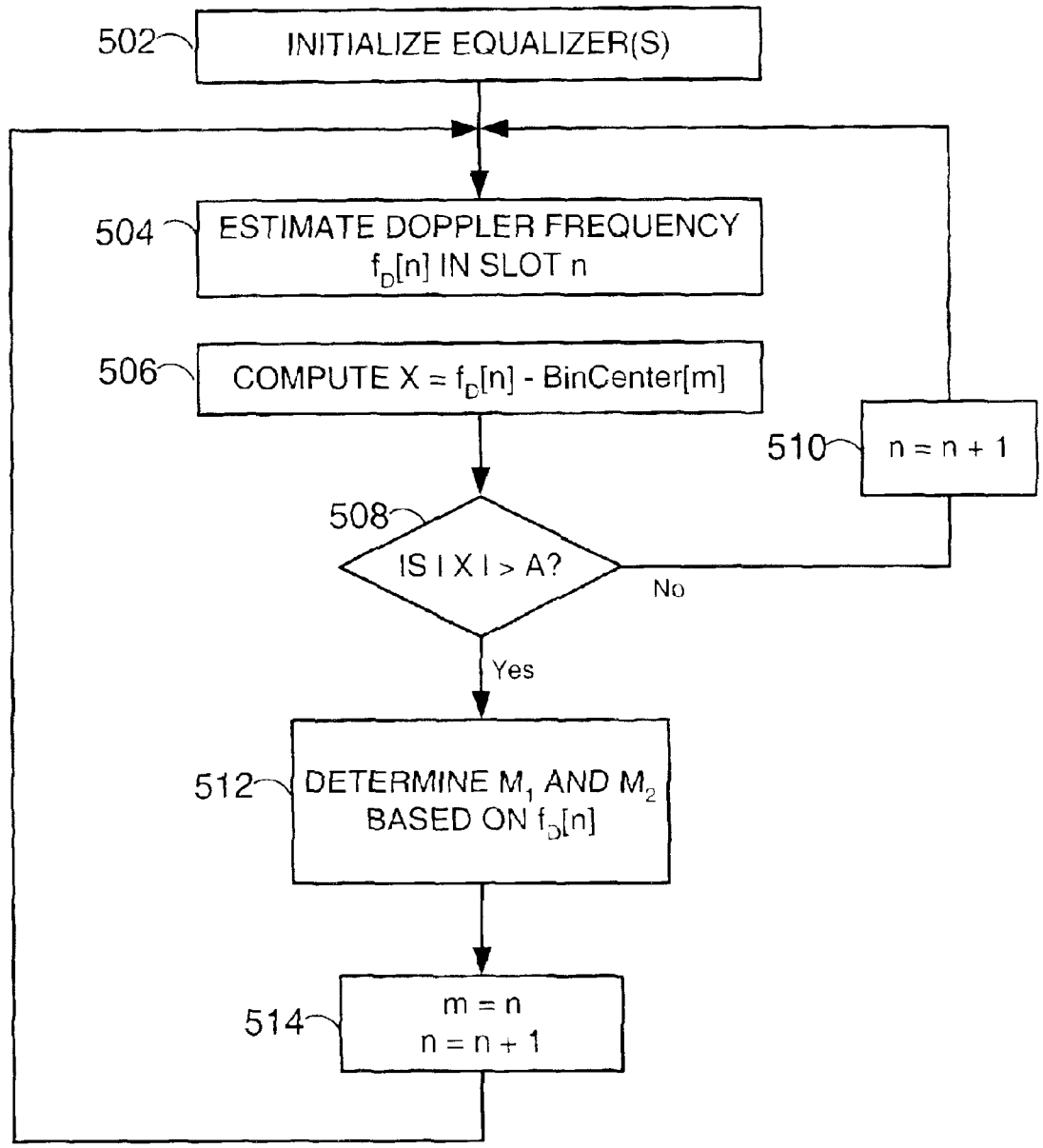
FIG. 5 is a flowchart that describes a more simple method according to an example embodiment of the present invention for adjusting the length of an adaptive equalizer.

FIG. 5 is a flowchart that describes a simplified method according to the present invention for adjusting the length of adaptive equalizer 108. As compared to the method described above with respect to FIG. 4, timers are not used and a simplified approach to selecting the number of taps based on Doppler frequency is adopted. These simplifications represent a tradeoff between performance and complexity.

In operation 502, adaptive equalizer 108 is initialized. The initial length is selected based on the Doppler frequency measured in the first slot ($f_D[0]$). According to this example embodiment of the present invention, a look-up table is consulted using the estimated Doppler frequency. An example of such a table is Table 3, shown below.

TABLE 3

| Doppler Frequency Range $f_D[n]$ (Hz) | $M_1$ | $M_2$ |
| --- | --- | --- |
| $0 \leq f_D[n] < 5$ | 15 | 15 |
| $5 \leq f_D[n] < 10$ | 11 | 11 |
| $10 \leq f_D[n] < 15$ | 8 | 8 |
| $15 \leq f_D[n] < 20$ | 6 | 6 |
| $20 \leq f_D[n] < 25$ | 4 | 4 |
| $25 \leq f_D[n] < 30$ | 3 | 3 |
| $30 \leq f_D[n]$ | 2 | 2 |

In operation 504, the Doppler frequency is measured for the current slot. In operation 506, a difference (X) is calculated between the Doppler frequency estimate for the current slot ($f_D[n]$) and the bin center of the Doppler frequency measurement corresponding to the most recent change (BinCenter[m]). In operation 508, this difference is compared to the bin width A. If the magnitude of the difference is not greater than A, then the length of adaptive equalizer 108 will not be changed for the current frame, and in operation 510 the slot index n is incremented before returning to operation 504 to wait for the next Doppler frequency estimate.

If the magnitude of X is greater than A, then in operation 512 the number of causal and anti-causal taps are determined using the current Doppler frequency estimate. According to an example embodiment of the present invention, a look-up table is consulted using the Doppler frequency. For example, Table 3 can be used to determine $M_1$ and $M_2$ given a particular Doppler frequency estimate.

In operation 514, the most recent change index m is updated to reflect the current slot index n, and the current slot index n is incremented to the next frame.

As described above, the costs associated with implementing the more simpler embodiment depicted in FIG. 5 are less than those associated with the more complex embodiment of FIG. 4. However, the more simple embodiment might not perform as well under certain conditions.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. In a wireless communications system wherein an equalizer is used to reduce interference on a communications channel, wherein a Doppler frequency is reflective of a rate of change of the communications channel, and wherein the equalizer comprises a main tap, a first number of causal taps, and a second number of anti-causal taps, a method for adjusting a length of the equalizer comprising increasing the length as the Doppler frequency decreases, and decreasing the length as the Doppler frequency increases, wherein said increasing comprises determining whether said causal taps are more useful than said anti-causal taps, and if so, increasing said first numbers, and if not, increasing said second number.

2. The method of claim 1, wherein said decreasing comprises determining whether said causal taps are more useful than said anti-causal taps, and if so, decreasing said second number, and if not, decreasing said first number.

3. The method of claim 1, wherein said increasing comprises determining whether an elapsed time since the equalizer was last adjusted is greater than a threshold, and if so, increasing the length as the Doppler frequency decreases.

4. The method of claim 1, wherein said increasing comprises determining whether an elapsed time since the length was last decreased is greater than a threshold, and if so, increasing the Length as the Doppler frequency decreases.

5. The method of claim 1, wherein said decreasing comprises determining whether an elapsed time since the equalizer was last adjusted is greater than a threshold, and if so, decreasing the length as the Doppler frequency increases.

6. The method of claim 1, wherein said decreasing comprises determining whether an elapsed time since the length was last increased is greater than a threshold, and if so, decreasing the length as the Doppler frequency increases.

7. A method comprising:
  receiving transmitted symbols over a wireless communications channel;
  receiving a first Doppler frequency, wherein said first Doppler frequency is reflective of a rate of change of said wireless communications channel at a first time;
  selecting a length of an equalizer based on said first Doppler frequency;
  receiving a second Doppler frequency that is reflective of a rate of change of said wireless communications channel at a second time;
  determining a difference between said first Doppler frequency and said second Doppler frequency; and
  adjusting said length responsive to determining said difference,
  wherein said adjusting comprises determining whether said difference is reflective of an increase that satisfies a first threshold, and if so, decreasing said length,
  wherein said equalizer comprises a main tap, a first number of causal taps, and a second number of anti-causal taps, and wherein said decreasing said length comprises determining whether said causal taps are more useful than said anti-causal taps, and if so, decreasing said second number, and if not, decreasing said first number.

8. The method of claim 7, further comprising filtering said transmitted symbols using said equalizer.

9. The method of claim 7, wherein said adjusting comprises:
  determining an elapsed time since a prior adjustment to said length; and
  determining whether said elapsed time satisfies an elapsed time threshold, and if so, adjusting said length based on said difference.

10. The method of claim 7, wherein said determining whether said causal taps are more useful than said anti-causal taps comprises:
  calculating a first average of the magnitudes of said causal taps;
  calculating a second average of the magnitudes of said anti-causal taps; and
  determining whether said first average is greater than said second average, and if so, determining that said causal taps are more useful, and if not, determining that said anti-causal taps are more useful.

11. The method of claim 7, wherein said determining whether said causal taps are more useful than said anti-causal taps comprises:

calculating a first magnitude of the causal tap furthest from said main tap;

calculating a second magnitude of the anti-causal tap furthest from said main tap; and determining whether said first magnitude is greater than said second magnitude, and if so, determining that said causal taps are more useful, and if not, determining that said anti-causal taps are more useful.

12. The method of claim 7, wherein said decreasing said length comprises decreasing said first and second number equally.

13. The method of claim 7, wherein said adjusting comprises determining whether said difference is reflective of a decrease that satisfies a second threshold, and if so, increasing said length.

14. The method of claim 13, wherein said increasing said length comprises determining whether said causal taps are more useful than said anti-causal taps, and if so, increasing said first number, and if not, increasing said second number.

15. The method of claim 13, wherein said increasing said length comprises determining whether said first number is less than said second number, and if so, increasing said first number, and if not, increasing said second number, and if said first number is equal to said second number, increasing said first number and said second number equally.

16. The method of claim 7, wherein said selecting comprises:

quantizing said first Doppler frequency into a first frequency bin having a first bin center; and determining said length using said first bin center.

17. The method of claim 16, wherein said determining said length comprises consulting a look-up table, wherein said look-up table associates said length with said first bin center.

18. The method of claim 7, further comprising: quantizing said first Doppler frequency into a first frequency bin having a first bin center;

determining a first difference between said first bin center and said second Doppler frequency; and adjusting said length based on said difference.

19. The method of claim 18, further comprising setting a bin center memory to said first bin center, and wherein said adjusting comprises:

determining whether said first difference is reflective of an increase that satisfies a first threshold, and if so, decreasing said length, quantizing said second Doppler frequency into a second frequency bin having a second bin center, and setting said bin center memory to said second bin center; and determining whether said first difference is reflective of a decrease that satisfies a second threshold, and if so, increasing said length, quantizing said second Doppler frequency into a third frequency bin having a third bin center, and setting said bin center memory to said third bin center.

20. The method of claim 19, further comprising:

receiving a third Doppler frequency that is reflective of a rate of change of said wireless communications channel at a third time subsequent to said second time;

determining a second difference between said bin center memory and said third Doppler frequency; and adjusting said length based on said second difference.

21. An equalizer for reducing interference on a wireless communications channel, wherein a Doppler frequency is reflective of a rate of change of the wireless communications channel, said equalizer comprising:

a main tap;

a first number of causal taps;

a second number of anti-causal taps;

means for selecting said first and second number based on the Doppler frequency;

means for initializing said first number and said second number using a first estimate of the Doppler frequency;

means for adjusting said first number and said second number using a second estimate of the Doppler frequency subsequent to said first estimate;

means for decreasing said length, if said second estimate exceeds said first estimate by an amount satisfying a first thresholds; and means for increasing said length, if said second estimate is less than said first estimate by an amount satisfying a second threshold, wherein said means for decreasing comprises means for determining whether said causal taps are more useful than said anti-causal taps, and if so, decreasing said second number, and if not, decreasing said first number.

22. The equalizer of claim 21, wherein said means for initializing comprises:

means for quantizing said first estimate into a first frequency bin having a first bin center; and means for determining said first number and said second number using said first bin center.

23. The equalizer of claim 22, wherein said means for determining comprises a look-up table.

24. The equalizer of claim 21, wherein said means for increasing comprises means for determining whether said causal taps are more useful than said anti-causal taps, and if so, increasing said first number, and if not, increasing said second number.

25. The equalizer of claim 21, wherein said means for decreasing comprises means for determining whether an elapsed time since said length was last increased satisfies a threshold, and if so, decreasing said length.

26. The equalizer of claim 25, wherein said means for increasing comprises means for determining whether an elapsed time since said length was last decreased satisfies a threshold, and if so, increasing said length.

27. An equalizer configured to reduce interference on a communications channel, wherein a Doppler frequency is reflective of a rate of change of the communications channel, the equalizer comprising:

a main tap;

a first number of causal taps;

a second number of anti-causal taps;

means for increasing a length of the equalizer as the Doppler frequency decreases; and means for decreasing the length of the equalizer as the Doppler frequency increases, wherein said means for increasing comprises means for determining whether said causal taps are more useful than said anti-causal taps, and if so, increasing said first number, and if not, increasing said second number.

28. The equalizer of claim 27, wherein said means for decreasing comprises means for determining whether said causal taps are more useful than said anti-causal taps, and if so, decreasing said second number, and if not, decreasing said first number.

* * * * *